United States Patent
Adams et al.

(10) Patent No.: US 8,408,246 B2
(45) Date of Patent: Apr. 2, 2013

(54) FUEL CARTRIDGE FOR FUEL CELLS

(75) Inventors: Paul Adams, Monroe, CT (US);
Andrew J. Curello, Hamden, CT (US);
Jens Thomas Mueller, Munich (DE)

(73) Assignee: Societe Bic, Clichy Cedex (FR)

( * ) Notice: Subject to any disclaimer, the term of this patent is extended or adjusted under 35 U.S.C. 154(b) by 1530 days.

(21) Appl. No.: 11/243,767

(22) Filed: Oct. 5, 2005

(65) Prior Publication Data

US 2007/0077470 A1 Apr. 5, 2007

(51) Int. Cl.
*E03B 7/07* (2006.01)
(52) U.S. Cl. .......................... 137/563; 429/444
(58) Field of Classification Search ................. 137/563;
429/34, 410, 444, 515; 220/495.01, 495.05,
220/720, 721, 723, 564, 23.87, 586; 95/241
See application file for complete search history.

(56) References Cited

U.S. PATENT DOCUMENTS

| | | | | |
|---|---|---|---|---|
| 3,377,766 A | * | 4/1968 | Nelson | 53/449 |
| 3,396,762 A | * | 8/1968 | Paton | 220/720 |
| H0000080 H | * | 7/1986 | Lewis | 222/95 |
| 4,969,577 A | * | 11/1990 | Werding | 222/94 |
| 5,183,087 A | | 2/1993 | Aubel et al. | |
| 5,544,208 A | | 8/1996 | Pao et al. | |
| 5,794,598 A | * | 8/1998 | Janik et al. | 123/514 |
| 5,881,692 A | * | 3/1999 | Lassanske | 220/495.06 |
| 5,979,481 A | * | 11/1999 | Ayresman | 220/721 |
| 6,116,723 A | * | 9/2000 | Childers | 347/85 |
| 6,460,733 B2 | | 10/2002 | Acker et al. | |
| 6,506,513 B1 | | 1/2003 | Yonetsu et al. | |
| 6,544,400 B2 | | 4/2003 | Hockaday et al. | |
| 6,682,186 B2 | | 1/2004 | Smith et al. | |
| 6,688,078 B2 | | 2/2004 | Mauclair et al. | |
| 6,796,644 B1 | | 9/2004 | Anderson et al. | |
| 6,797,027 B2 | | 9/2004 | Stenersen et al. | |
| 6,802,491 B1 | | 10/2004 | Kelly et al. | |
| 6,893,119 B2 | * | 5/2005 | Ushiro | 347/86 |
| 6,924,054 B2 | * | 8/2005 | Prasad et al. | 429/34 |
| 7,117,732 B2 | * | 10/2006 | Curello et al. | 73/149 |
| 2003/0121481 A1 | | 7/2003 | Dodd et al. | |
| 2003/0218027 A1 | * | 11/2003 | Schiestl et al. | 222/183 |
| 2005/0023236 A1 | | 2/2005 | Adams et al. | |
| 2005/0084738 A1 | | 4/2005 | Ohlsen et al. | |

FOREIGN PATENT DOCUMENTS

CN 1612384 A 5/2005
EP 1 306 917 A 5/2003

OTHER PUBLICATIONS

European Search Report issued, in connection with corresponding European Patent Application No. 06816255.1, on Oct. 10, 2009.
Translated Abstract for CN 1612384 A.
Extended European Search Report issued in connection with the corresponding European divisional patent application No. 12155754.0 on Mar. 8, 2012.

\* cited by examiner

*Primary Examiner* — Craig Schneider
*Assistant Examiner* — Andrew J Rost
(74) *Attorney, Agent, or Firm* — The H.T. Than Law Group

(57) ABSTRACT

A fuel cartridge with a deformable inner fuel container connectable to a fuel cell is disclosed. The pressure in the inner fuel container is controlled.

11 Claims, 3 Drawing Sheets

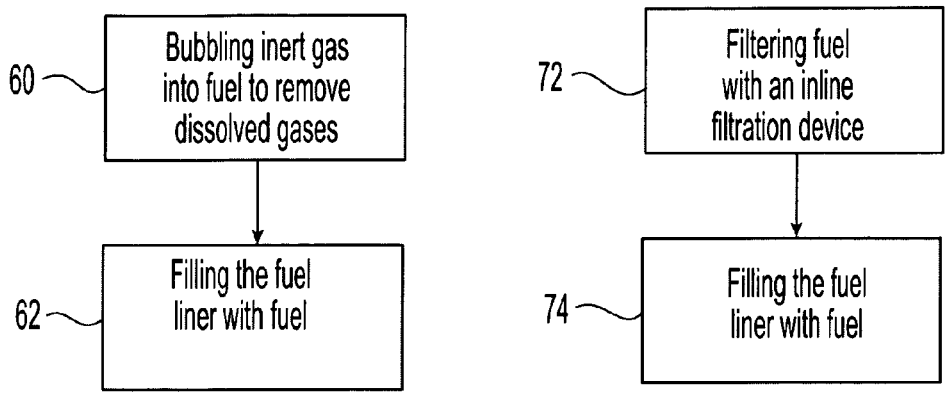
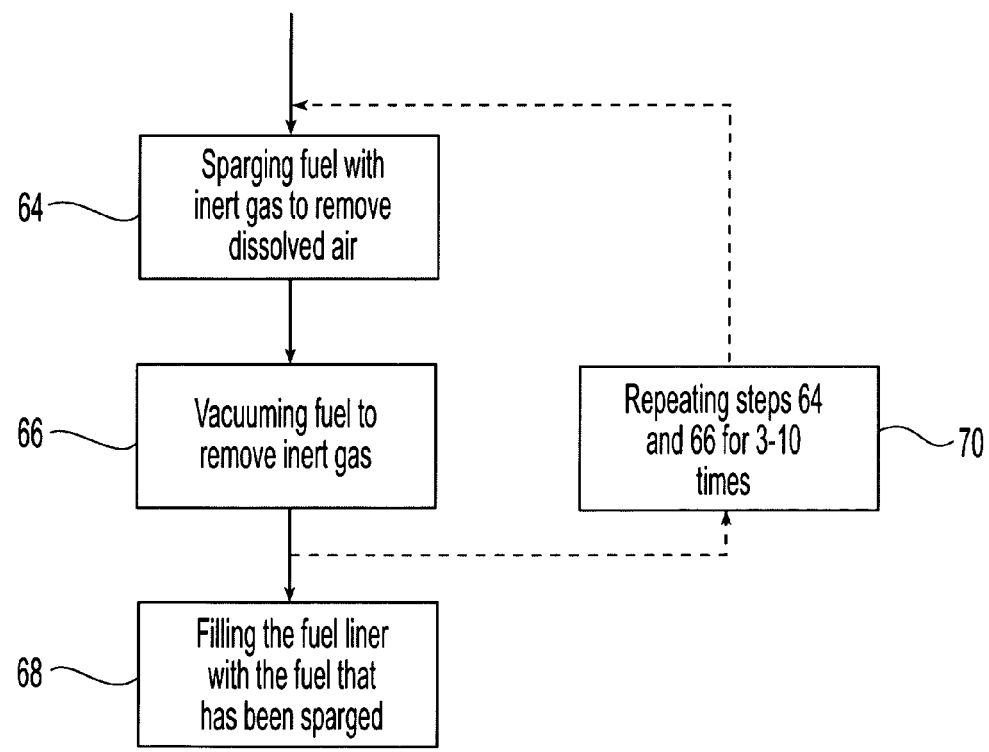
Fig. 4A
Fig. 4C
Fig. 4B

FUEL CARTRIDGE FOR FUEL CELLS

FIELD OF THE INVENTION

This invention generally relates to fuel supplies for fuel cells, and more particularly to fuel supplies that minimize pressure inside a liner within the fuel supplies.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel, as well as portable power storage, such as lithium-ion batteries.

In general, fuel cell technology includes a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into several general categories, namely (i) fuel cells utilizing compressed hydrogen ($H_2$) as fuel; (ii) proton exchange membrane (PEM) fuel cells that use alcohols, e.g., methanol ($CH_3OH$), metal hydrides, e.g., sodium borohydride ($NaBH_4$), hydrocarbons, or other fuels reformed into hydrogen fuel; (iii) PEM fuel cells that can consume non-hydrogen fuel directly or direct oxidation fuel cells; and (iv) solid oxide fuel cells (SOFC) that directly convert hydrocarbon fuels to electricity at high temperature.

Compressed hydrogen is generally kept under high pressure and is therefore difficult to handle. Furthermore, large storage tanks are typically required and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. The most common direct oxidation fuel cells are direct methanol fuel cells or DMFC. Other direct oxidation fuel cells include direct ethanol fuel cells and direct tetramethyl orthocarbonate fuel cells. DMFC, where methanol is reacted directly with oxidant in the fuel cell, is the simplest and potentially smallest fuel cell and also has promising power application for consumer electronic devices. SOFC convert hydrocarbon fuels, such as butane, at high heat to produce electricity. SOFC requires relatively high temperature in the range of 1000° C. for the fuel cell reaction to occur.

The chemical reactions that produce electricity are different for each type of fuel cell. For DMFC, the chemical-electrical reaction at each electrode and the overall reaction for a direct methanol fuel cell are described as follows:

Half-Reaction at the Anode:

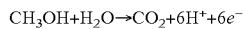

Half-Reaction at the Cathode:

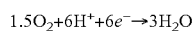

The Overall Fuel Cell Reaction:

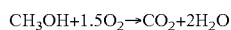

Due to the migration of the hydrogen ions ($H^+$) through the PEM from the anode to the cathode and due to the inability of the free electrons ($e^-$) to pass through the PEM, the electrons flow through an external circuit, thereby producing an electrical current through the external circuit. The external circuit may be used to power many useful consumer electronic devices, such as mobile or cell phones, calculators, personal digital assistants, laptop computers, and power tools, among others.

DMFC is discussed in U.S. Pat. Nos. 5,992,008 and 5,945,231, which are incorporated herein by reference in their entireties. Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

In another direct oxidation fuel cell, borohydride fuel cell (DBFC) reacts as follows:

Half-Reaction at the Anode:

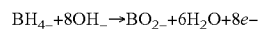

Half-Reaction at the Cathode:

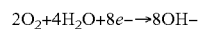

In a Chemical Metal Hydride Fuel Cell, Sodium Borohydride is Reformed and Reacts as Follows:

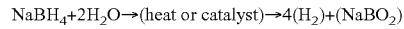

Half-Reaction at the Anode:

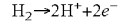

Half-Reaction at the Cathode:

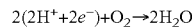

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. A sodium borohydride fuel cell is discussed in U.S. Pat. No. 4,261,956, which is incorporated herein by reference in its entirety.

One of the important features for fuel cell application is fuel storage. When a liquid fuel such as methanol is stored in the fuel supply or in a fuel liner within the fuel supply, unwanted pressure may build within the fuel supply or the fuel liner.

SUMMARY OF THE INVENTION

This invention is directed to a fuel supply connectable to a fuel cell comprising an outer casing and an inner fuel container containing fuel for the fuel cell. The space between the fuel container and the outer casings can be filled with a gas. The gas can be an inert gas, air, nitrogen, or carbon dioxide and the gas can also be pressurized.

The fuel supply can further comprise a check valve disposed on the outer casing to regulate the pressure in the space between the outer casing and the fuel liner, or adjust the amount of the gas stored in the same space. A seal may cover the check valve, to limit the movement of gases into or out of the space between the outer casing and the fuel liner during storage. The entire fuel supply may also be disposed in an airtight outer packaging. A check valve or gas permeable, liquid impermeable membrane may also be disposed on the inner fuel container to regulate the internal pressure of the inner container.

The present invention is further directed to methods of controlling pressure inside a fuel cartridge, and methods for de-gassing the fuel to control the pressure inside the fuel cartridge.

BRIEF DESCRIPTION OF THE DRAWINGS

FIG. 4A is a flow chart depicting a method of using inert gas to remove dissolved gas in the fuel; FIG. 4B is a flow chart depicting a method of repeatedly using inert gas and vacuum to remove dissolved gas in the fuel; and FIG. 4C is a flow chart depicting a method of using an inline filtration device to remove dissolved gas in the fuel.

DETAILED DESCRIPTION OF THE PREFERRED EMBODIMENTS

Figure 1:
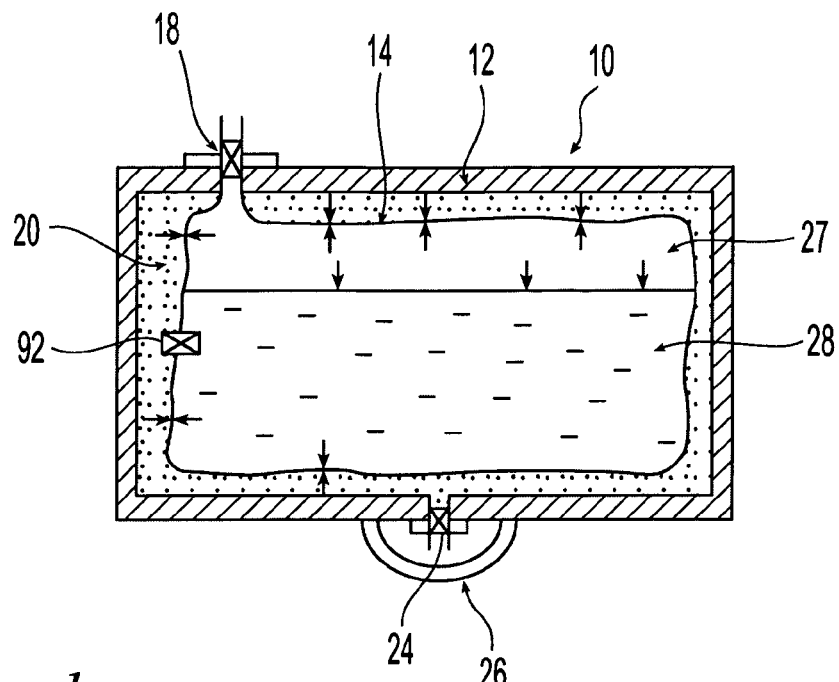
FIG. 1 is a cross-sectional view of a fuel cartridge in accordance with the present invention.

As illustrated in the accompanying drawings and discussed in detail below, the present invention is directed to a fuel supply, which stores fuel cell fuels such as methanol and water, methanol/water mixture, methanol/water mixtures of varying concentrations or pure methanol. Methanol is usable in many types of fuel cells, e.g., DMFC, enzyme fuel cells and reformat fuel cells, among others. The fuel supply may contain other types of fuel cell fuels, such as ethanol or alcohols, metal hydrides, such as sodium borohydride, other chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid-borne zinc particles immersed in a KOH electrolytic reaction solution, and the anodes within the cell cavities are particulate anodes formed of the zinc particles. KOH electrolytic solution is disclosed in United States published patent application no. 2003/0077493, entitled "Method of Using Fuel Cell System Configured to Provide Power to One or More Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include a blend or mixture of methanol, sodium borohydride, an electrolyte and other compounds, such as those described in U.S. Pat. Nos. 6,554,877, 6,562,497 and 6,758,871, which are incorporated by reference in their entireties. Fuels also include those that are partially dissolved in solvent and partially suspended in solvent, described in U.S. Pat. No. 6,773,470 and those that include both liquid fuel and solid fuels, described in United States published patent application number 2002/076602. These references are also incorporated by reference in their entireties. Fuels also include hydrogen.

Fuels also include a metal hydride such as sodium borohydride ($NaBH_4$) and water, discussed above, and the low pressure, low temperature produced by such reaction. Fuels further include hydrocarbon fuels, which include, but are not limited to, butane, kerosene, alcohol and natural gas, disclosed in United States published patent application no. 2003/ 0096150, entitled "Liquid Hereto-Interface Fuel Cell Device," published on May 22, 2003, which is incorporated herein by reference in its entirety. Fuels also include liquid oxidants that react with fuels. The present invention is, therefore, not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, gaseous, liquids, solids and/or chemicals and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supplies.

The fuel supply of the present invention can also be used to store fuels that are not used in fuel cells. These applications include, but are not limited to, storing hydrocarbons and hydrogen fuels for micro gas-turbine engine built on silicon chips, discussed in "Here Come the Microengines," published in The Industrial Physicist (December 2001/January 2002), at pp. 20-25. As used in the present application, the term "fuel cell" also includes microengines. Other applications include storing traditional fuels for internal combustion engines, and hydrocarbons, such as butane for pocket and utility lighters and liquid propane.

When a liquid fuel, such as methanol, is stored in the fuel container, pressure can build up within the container over time. The pressure buildup within the fuel container may increase the velocity of fuel as it exits from the container. The increase in pressure can be influenced by a number of factors, including partial vapor pressure from the fuel in the gaseous state.

Referring to FIG. 1, fuel cartridge 10 comprises an outer casing 12, and an inner fuel container 14 that contains a fuel. Inner fuel container 14 is contained within outer casing 12 and space 20 is defined to be between outer casing 12 and inner fuel container 14. Fuel cartridge 10 further comprises shut-off valve 18, which is in fluid communication with inner fuel container 14. Fuel cartridge 10 further comprises a relief valve 24 on casing 12, which can be a check valve, a ball valve or a poppet-type valve. An optional removable seal 26 covers check valve 24. Inner fuel container 14 contains fuel 28, such as methanol or any of the suitable fuels discussed above, and may have head space 27 above the fuel.

Outer casing 12 is preferably rigid, but can also be sufficiently flexible to be compressed along with inner fuel container 14, as fuel is transported from the cartridge. A rigid outer casing can provide additional structural support to fuel liner 14. Outer casing 12 is preferably made from metals, such as stainless steel or polyacetal resin, which can be injection molded or extruded. Optionally, outer casing 12 can be made from materials that are free of contaminants such as zinc, sulfur, talc and oils, and may be treated with fluorine to minimize permeation. Outer casing 12 may also be made from an open mesh material, which may resist expansion of inner fuel container 14 and may collapse as fuel is withdrawn from inner fuel liner 14.

Inner fuel container 14 is preferably flexible and deformable, e.g., a fuel liner, such that the volume inside fuel liner 14 decreases when fuel is being transported to the fuel cell. Most preferably, fuel liner 14 is thin and made from a durable and flexible material so that it efficiently collapses or reduces its volume, as fuel is withdrawn. Examples of materials for the fuel liner 14 include natural rubber, polyethylene (including low density to high density PE), ethylene propylene (EP), EPDM and other thin polymeric films. The polyethylene can be laminated with a vapor barrier layer, such as aluminum foil or fluorine treated plastics, to reduce methanol permeation. Preferably, fuel liner 14 is made from a low density polyethylene, and is blow-molded to form a thin-walled bladder. Such fuel liner and outer casing and suitable materials for same are fully discussed in commonly-owned co-pending U.S. patent application Ser. No. 10/629,004, entitled "Fuel Cartridge with Flexible Liner," filed on Jul. 29, 2003; Ser. No. 10/725,244, entitled "Fuel Cell Supply Having Fuel Compatible Materials," filed on Dec. 1, 2003; and Ser. No. 10/913,715, entitled "Fuel Supplies for Fuel Cells," filed on Aug. 6, 2004. The '004, '244 and '715 applications are incorporated herein by reference in their entireties. An advantage of having a collapsible and deformable fuel liner 14 is that since fuel liner 14 collapses, as fuel is transported to the fuel cell, fuel cartridge 10 is usable in any orientation.

Shut-off valve 18 is adapted to be connected to a fuel cell (not shown) or to a refilling fuel container/cartridge or a refill adaptor. Shut-off valves are fully discussed in commonly owned, co-pending U.S. patent application Ser. No. 10/629,006, entitled "Fuel Cartridge with Connecting Valve," filed on Jul. 29, 2003 ("the '006 Application"), the disclosure of which is incorporated herein by reference in its entirety. Shut-off valve 18 can also be replaced by a porous or fibrous material capable of transporting fuel through capillary or wicking action, or an elastomeric material that can be opened or pierced with a pin or needle such as a septum. Suitable capillary or wicking materials are fully discussed in commonly-owned, co-pending U.S. patent application Ser. No. 10/356,793, filed on Jan. 31, 2003, entitled "Fuel. Cartridges for Fuel Cells," the disclosure of which is incorporated herein by reference in its entirety. Check valve 24 is fully described in the '004 patent application.

In one embodiment of the present invention when the outer casing is substantially rigid, space 20 of the fuel cartridge 10 is be filled with an effective amount of gas to reduce the permeation or movement of atmospheric air, water vapor and other gases into the fuel liner 14 through space 20 during the expected life of the cartridge. An effective amount of gas includes up to 100% of inert gas in space 20, but can be lower than 100%, and can be as low as 50%. Suitable gases include, but are not limited to, inert gases (helium, neon, argon, krypton, xenon, radon), nitrogen, and carbon dioxide. The preferred gases are helium, argon, krypton, nitrogen, and carbon dioxide. The more preferred inert gases are argon and krypton. Suitable gases in accordance with the present invention do not include gases that can be used as fuel for the fuel cells. The outer casing can also be flexible.

The ideal gas laws govern the pressure buildup inside head space 27 inside liner 14 and in space 20. Boyle's law states that at constant temperature, the volume of a gas varies inversely with the pressure. Charles' law states that at constant pressure, the volume of a gas varies directly with the absolute temperature, and that at constant volume the pressure of a gas varies directly with the absolute temperature. Dalton's law states that the total pressure of a mixture of gases is equal to the sum of the partial pressures due to each type of gas. Without being limited to any theory, Dalton's law will be used to describe the invention.

Inside head space 27 shown in FIG. 1, the total pressure ($P_{total\text{-}27}$) is equal to the sum of the partial pressure of fuel such as methanol ($P_{methanol\text{-}27}$) and the partial pressure of any air or other gases ($P_{air\text{-}27}$) present therein:

$$P_{total\text{-}27} = P_{methanol\text{-}27} + P_{air\text{-}27}$$

The total pressure ($P_{total\text{-}20}$) of space 20 is equal to the sum of the partial pressure of the inert gas ($P_{inert\ gas\text{-}20}$) and the partial pressure of any air ($P_{air\text{-}20}$) present therein:

$$P_{total\text{-}20} = P_{inert\ gas\text{-}20} + P_{air\text{-}20}$$

At any given time, the total pressure of the head space 27 is counter-balanced by the total pressure of space 20 and preferably the pressures in space 27 and space 20 are substantially similar to minimize the net pressure exerted on fuel liner 14, i.e.:

$$P_{total\text{-}27} \sim P_{total\text{-}20}$$

According to this invention, the selected inert gas generates partial pressure for space 20 at different stages of usage of methanol in fuel liner 14 including the stage when pressure buildup occurs. When the total pressure of the head space 27 increases, it is counter-balanced by the total pressure of space 20:

$$P_{methanol\text{-}27} + P_{air\text{-}27} \sim P_{inert\ gas\text{-}20} + P_{air\text{-}20}$$

Preferably, the inert gas is pressurized to increase its density in space 20 when fuel liner 14 is substantially full. In this state, liner 14 is supported by the fuel and can withstand the pressure from the inert gas. When fuel liner 14 is partially or substantially empty, the high density inert gas expands to fill up the space of the withdrawn fuel and continue to apply pressure on fuel liner 14, albeit less than the exerted pressure when the fuel liner was full, thereby minimizing the tendency for the gas within space 27 to expand. This also minimizes the net pressure exerted on fuel liner 14.

The level of pressure to apply to the inert gas when fuel liner 14 is substantially full can be determined by the following factors: the gas law, and the volume of space 20 when the fuel liner is substantially full and the volume of space 20 when the fuel liner is substantially emptied. Preferably, when the fuel liner is substantially empty, the pressure applied by the inert gas on fuel liner 14 is at least 4 psi higher than atmospheric pressure, and more preferably at least 6 psi and most preferably at least 8 psi.

The presence of inert gas in space 20 can be an effective insulating barrier that reduces the permeation of atmospheric air, water vapor and other gases from entering through the wall of the fuel liner 14. The presence of gas in space 20 disrupts the gradient of concentration of atmospheric gas from the atmosphere to space 20 to head space 27, thereby reducing the permeation rate of atmospheric air.

The invention also allows for the regulation of pressure when temperature of the fuel cartridge varies from hot to cold. Temperature simultaneously increases the partial pressures of the gases in head space 27 and the partial pressures of the gases in space 20. The increased total pressure in head space 27 is therefore counter-balanced by the increased total pressure in space 20.

Seal 26 can be placed over check valve 24 to minimize further the movement of air, nitrogen and any other kind of atmospheric gas into space 20 and into fuel liner 14 during storage and transit. Seal 26 can be removed before use by the user or automatically as cartridge 10 is remove from its packaging. Suitable materials for the seal 26 include, but are not limited to, saran wrap, aluminum foil or compressed exfoliated graphite foil described in the '004 application. Alternatively, seal 26 can be adopted from:

(1) the sealing system for filter assemblies and filter systems for intake air for fuel cells as discussed in U.S. Pat. No. 6,797,027 to Stenersen, et al., entitled "Filter Assemblies and Systems for Intake Air for Fuel Cells," which is incorporated herein by reference in its entirety;

(2) the seal for ink inlet as discussed in U.S. Pat. No. 6,796,644 to Anderson, Jr., et al., entitled "Ink Source Regulator for an Inkjet Printer," which is incorporated herein by reference in its entirety; or (3) the seal means as discussed in U.S. Pat. No. 6,802,491 to Kelly, et al., entitled "Fluid Shut Off Valve Cartridge with Quick Connection," which is incorporated herein by reference in its entirety.

Figure 2:
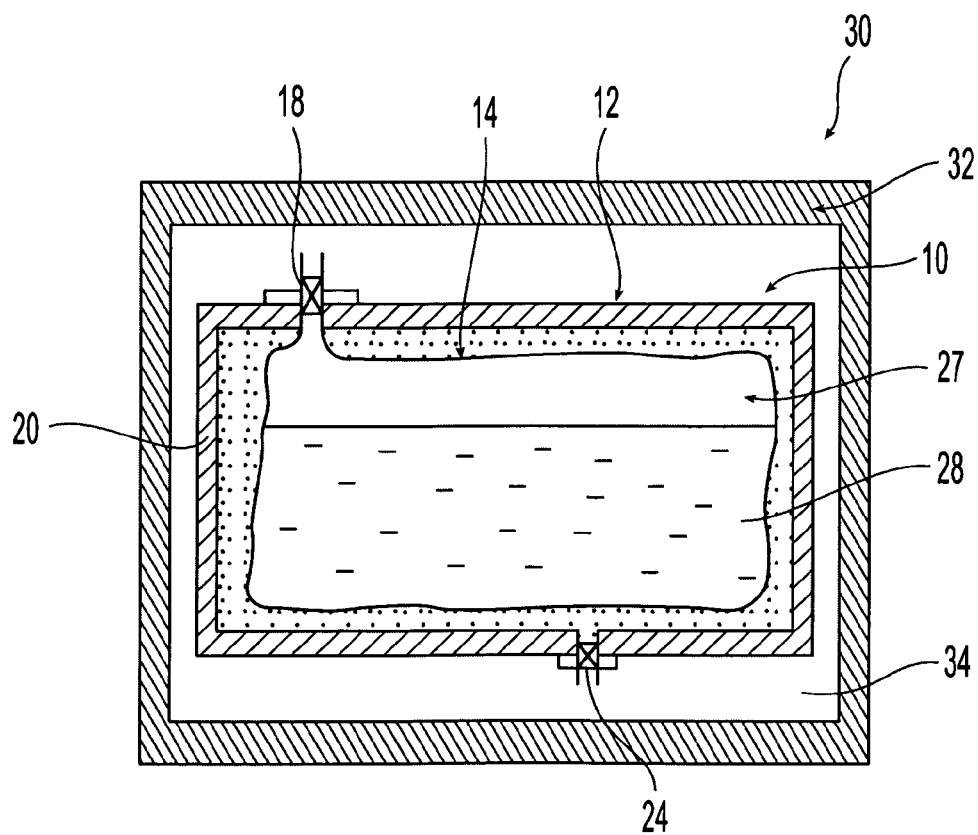
FIG. 2 is a cross-sectional view of a fuel cartridge sealed inside outer packaging.

Referring to FIG. 2, optional outer packaging 30 encloses and seals the fuel cartridge 10. Sealing walls 32 ensure that the packaging 30 is substantially airtight. Space 34, defined as the space between the sealing 32 and the fuel cartridge 10, can either be filled with an inert gas, or be kept in vacuum. Outer packaging 30 can be covered with peelable films that are suitable for packaging food, as discussed in U.S. Pat. No. 6,688,078 to Mauclair, et al., entitled "Pouch or Packaging for Foodstuffs Made of a Peelable Film and Process for the Production Thereof," which is incorporated herein by reference in its entirety. The peelable film comprises a first oriented polyamide layer, which is coupled with a second co-extruded peelable polyethylene layer. This peelable film is produced by Sudpack GmbH, Ochsenhausen, Germany. The first oriented polyamide layer has a thickness of about 15 microns, and the second co-extruded peelable polyethylene layer has a thickness of about 60 microns. The sealing between the two portions of the peelable film to form a package takes place between the inner polyethylene sides. Additional materials suitable for the outer packaging include materials suitable for seal 26. Alternatively, such film can cover cartridge 10 directly or such film can be vacuum packed around cartridge 10 to remove air pockets between the cartridge and the film.

Figure 3:
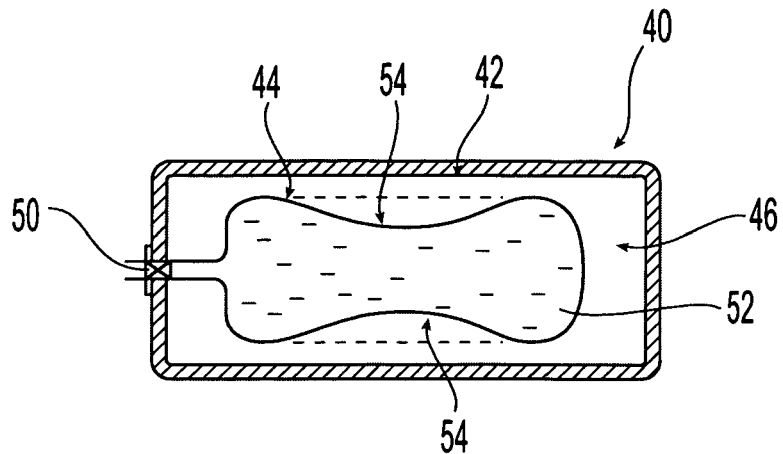
FIG. 3 is a cross-sectional view of a fuel cartridge having a fuel liner filled to a predetermined amount less than full capacity.

Referring to FIG. 3, in another embodiment of the present invention fuel cartridge 40 comprises an outer casing 42, and a fuel liner 44 that contains a fuel and is disposed within the outer casing 42. Outer casing 42 is preferably rigid. Fuel liner 44 is preferably flexible or collapsible. Space 46 is defined to be the space between outer casing 42 and fuel liner 44. Fuel cartridge 40 further comprises a shut-off valve 50, which is in fluid communication with fuel liner 44. Fuel liner 44 contains fuel 52, such as methanol. The amount of fuel 52 inside the fuel liner 44 is less than full capacity of the liner by a predetermined amount, e.g., by about 10%. Space 54 represents the difference in volume between about full capacity and capacity.

This can be achieved by either (1) filling the fuel liner with the fuel to about full capacity and then withdrawing a predetermined volume, e.g., about 10% or some other predetermined amount of the fuel from the fuel liner, or (2) compressing an empty fuel liner to a predetermined amount, e.g., about 90% less than full capacity and filling such remaining volume with fuel. By either method, the fuel liner is filled at less than capacity. When pressure buildup begins within the fuel liner, there is room for expansion without stressing the fuel liner. Although 10% is used here as an example, any percentage of fuel may be withdrawn or withheld from the fuel cartridge. The amount of withdrawn fuel can be based in part on the thermal expansion of fuel.

Several other techniques may be utilized when filling inner liner 14 to minimize gases, such as air, from entering inner liner 14. One such method is to fill inner liner 14 with fuel 28, then overfill inner liner 14 with an inert or non-reactive gas including but not limited to argon and nitrogen. These gases are intended to substantially fill the void spaces within inner liner 14, and will slow the permeation of air into inner liner 14.

Additionally, it is advantageous in some instances to create a slightly increased back pressure or low-level vacuum within inner liner 14. This back pressure may be created in a variety of different manners. After inner liner 14 is completely filled, a small amount of fuel is vacuumed out in order to deform inner liner 14. Another method of creating the slight back pressure is to heat the fuel prior to filling inner liner 14 from a tank. Inner liner 14 is then filled completely and sealed. As the fuel in inner liner 14 cools, it contracts, thereby causing inner liner 14 to slightly compress.

In accordance with another aspect of the present invention, dissolved gas in the fuel is removed to minimize partial pressure build-up during use. Referring to FIG. 4A, a method of removing dissolved gases in the fuel is described. In step 60, inert gas is contacting the fuel, preferably by percolation. In step 62, the degassed fuel is used to fill the fuel liner. Suitable inert gas includes, but is not limited to, argon and helium. This process of degassing of the fuel can be carried out by using an inert gas sparging system commonly used in conjunction with high performance liquid chromatography (HPLC).

Another method of removing dissolved gases in the fuel is described in FIG. 4B. In step 64, inert gas is percolating into the fuel. In step 66, the inert gas is removed, preferably by vacuuming the fuel. Optionally, steps 64 and 66 may be repeated any number of times, e.g., 2 to 10 times. In step 68, the degassed fuel is used to fill the fuel liner. The degassed fuel can be vacuumed before being transported to the fuel cartridge.

Another method of removing dissolved gases in the fuel is described in FIG. 4C. In step 72, the fuel is filtered with an inline filtration device. In step 74, the filtered fuel is used to fill the fuel liner. Recent separation technology can now extract virtually all dissolved gasses from solution in a simple and affordable manner. Suitable inline filtration devices are available from insight Process Solution in Hendersonville, N.C.

Figure 5:
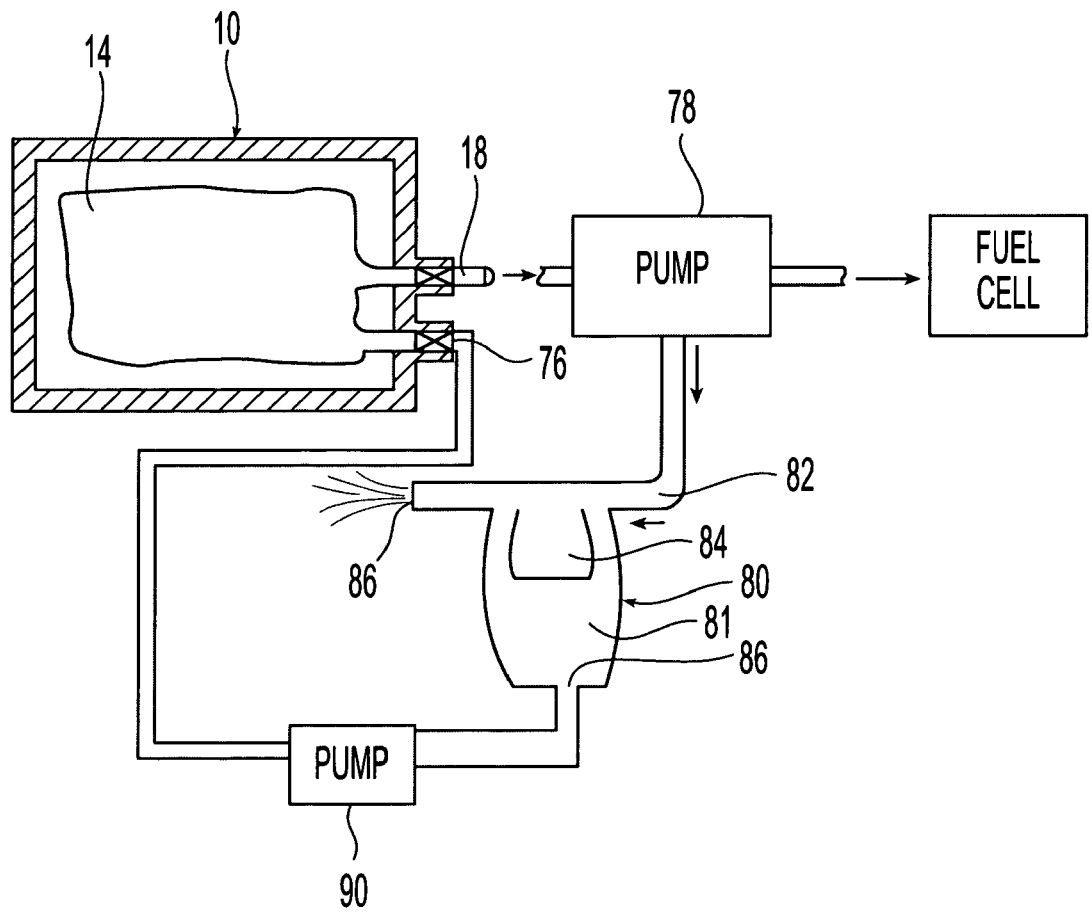
FIG. 5 is a schematic drawing of a fuel cartridge with a de-gassing system.

In order to de-gas the fuel after disposition within inner liner 14, the system may periodically pass the fuel through a gas-liquid separator. As shown in FIG. 5, cartridge 10 includes an inner liner with two valves, a first valve 18, similar to valve 18 shown in FIG. 1, and a second intake valve 76. Cartridge 10 is connected to a first pump 78, which extracts fuel from inner liner 14. First pump 78 may either pass the extracted fuel to the fuel cell, or it may pump the extracted fuel to a gas separator 80 for purification.

Gas separator may be any gas-liquid separators known in the art. One example of a gas separator is a gas-permeable, liquid-impermeable membrane. The fuel is passed through an orifice containing such a membrane, and the separated gas is vented, for example, to the atmosphere while the fuel is either pumped to the fuel cell or returned to inner liner 14 or may be used as fuel for the fuel cell directly. Preferably, this membrane only allows air or other gases to leave the cartridge, and keeps liquid from leaving the cartridge. Such gas permeable, liquid impermeable membrane is disclosed in the '793 application, previously incorporated by reference, in U.S. Pat. No. 3,508,708, entitled "Electric Cell with Gas Permeable Vent Stopper," issued on Apr. 21, 1970, and in U.S. Pat. No. 4,562,123, entitled "Liquid Fuel Cell," issued on Dec. 31, 1985. The disclosures of these references are incorporated herein by reference in their entireties. Such membranes can be made from polytetrafluoroethylene (PTFE), nylon, polyamides, polyvinylidene, polypropylene, polyethylene or other polymeric membrane. A commercially available hydrophobic PTFE microporous membrane can be obtained from W.L Gore Associates, Inc. Gore-Tex® is a suitable membrane. Gore-Tex® is a microporous membrane containing pores that are too small for liquid to pass through, but are large enough to let gas through.

More complex gas-liquid separators are also known in the art. For the purposes of example only, another gas separator 80 is described herein as similar to a known carbon dioxide separator. Those skilled in the relevant art will recognize that other separators are also able to be used in the present invention.

Gas separator 80 includes an inlet valve 82, through which impure fuel enters a hollow chamber 81. Upon entering hollow chamber 61, the fluid stream encounters a vortex generator 84, which causes the fuel to spin within hollow chamber 81. As the fluid stream spins, the liquid therein is forced to the inner walls of hollow chamber 81. Any gas within the fluid stream rises to the top of hollow chamber 81 and is vented to the atmosphere through outlet 86. Alternately, the gas vapors exiting gas separator 80 through outlet 86 may be in turn transferred to a mixing chamber of the fuel cell, the anode loop of the fuel cell, or a catalytic burner. In order not to waste the vapors, the fuel vapors may be condensed and re-introduced into inner liner 14. The liquid in the fluid stream collects at the bottom of hollow chamber 81 and passes through a liquid outlet 88. The degassed liquid fuel is then pumped via a second pump 90 back into inner liner through intake valve 76.

The pumps used for moving fuel from cartridge 10 to the fuel cell and/or gas separator 80 can be any pump capable of transporting fluid at the desired rate. Suitable pumps include, but are not limited to, microelectromechanical pumps (MEMS), such as those discussed and claimed in the '793 patent application, previously incorporated by reference. The MEMS pump can be either a field-induced pump or a membrane-displacement pump. A field-induced pump has an AC or DC electrical field or magnetic field applied to the fuel/liquid to pump the fuel/liquid. Suitable field-induced pumps include, but are not limited to, electrohydrodynamic pump, magnetohydrodynamic pump and electro-osmotic pump. The electrohydrodynamic pump and an electro-osmotic pump can be used together. A membrane-displacement pump comprises a membrane and a force is applied to the membrane causing the membrane to move or vibrate to pump the fuel. Suitable membrane-displacement pumps include, but are not limited to, electrostatic pump, piezoelectric pump and thermopneumatic pump. The MEMS pump controls the speed of the flow of fuel and reverses the flow, as well as stopping the flow.

In another embodiment, liner 14 can have a relief valve 92 similar to relief valve 24 as shown in FIG. 1 disposed thereon to release pressure when the internal pressure of liner 14 reaches a predetermined level. Relief valve 92 may be utilized to vent vapors that build up within inner liner 14. Preferably, relief valve 92 includes a membrane that permits the transmission of gaseous but not liquid substances. Suitable membranes are discussed above and include commercially available materials such as Gore-Tex®. The vapors vented from inner liner 14 are vented to a point outside of inner liner 14, for example to space 20 between inner liner 14 and casing 12 or to the atmosphere. Relief valve 92 can be selected to open when the internal pressure of liner 14 exceeds the pressure in space 20 by a predetermined pressure, e.g., greater than about 2 psi. Alternatively, relief valve 92 can be replaced by a gas permeable, liquid impermeable membrane so that gas or vapors can exit liner 14 whenever the gas is in contact with the membranes and whenever its pressure is higher than the pressure in space 20. The liquid impermeable, gas permeable membrane can be positioned at one or more locations anywhere on liner 14 and can take up to 50% or more of the liner. Suitable membranes are disclosed in co-pending '793 application, previously incorporated by reference.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

We claim:

1. A fuel supply connectable to a cell, comprising:
    an outer casing, wherein the outer casing is sealed;
    an inner fuel container comprising fuel for the fuel cell, wherein the inner fuel container is made from a polymeric material and wherein the inner fuel container collapses or reduces its volume as fuel is withdrawn;
    a valve adapted to transport the fuel to the fuel cell; and
    a means for minimizing the net pressure exerted on the inner fuel container at any given time in accordance to ideal gas laws.

2. The fuel supply of claim 1, wherein the fuel supply is connected to a pump to transport the fuel.

3. A fuel supply connectable to a fuel cell, comprising:
    an outer casing, wherein the outer casing is sealed; and
    an inner fuel container comprising fuel for the fuel cell, wherein the inner fuel container is made from a polymeric material and wherein the inner fuel container collapses or reduces its volume as fuel is withdrawn, and
    a valve adapted to transport the fuel to the fuel cell,
    wherein the inner fuel container comprises a first head space having a total pressure $P_1$, Wherein a second space between the outer casing and the inner fuel container is filled with a gas to control the pressure $P_1$ of the inner fuel container, wherein the gas is a member selected from the group consisting of helium, neon, argon, krypton, xenon, radon, nitrogen, and carbon dioxide, and wherein the second space has a total pressure $P_2$ substantially in equilibrium with $P_1$ at any Oven time in accordance to ideal gas laws, and wherein the first head space comprises fuel vapor.

4. The fuel supply of claim 3, wherein the gas is pressurized.

5. The fuel supply of claim 3, wherein the gas disrupts the gradient of air from the atmosphere to the inner fuel container.

6. The Mel supply of claim 3, wherein the fuel supply is sealed inside an outer packaging.

7. The fuel supply of claim 6, wherein a space between the outer packaging and the fuel supply is filled with a gas, wherein the gas is a member selected from the group consisting of helium, neon, argon, krypton, xenon, radon, nitrogen, and carbon dioxide.

8. The fuel supply of claim 6, where the space between the outer packaging and the fuel supply is vacuumed.

9. The fuel supply of claim 3, wherein the outer casing is rigid.

10. The fuel supply of claim 3, wherein the inner fuel container is deformable.

11. The fuel supply of claim 3, wherein the fuel supply is connected to a pump to transport the fuel.

* * * * *

UNITED STATES PATENT AND TRADEMARK OFFICE
CERTIFICATE OF CORRECTION

PATENT NO. : 8,408,246 B2
APPLICATION NO. : 11/243767
DATED : April 2, 2013
INVENTOR(S) : Paul Adams et al.

Page 1 of 1

It is certified that error appears in the above-identified patent and that said Letters Patent is hereby corrected as shown below:

In the Claims:

In column 10, line 18 in Claim 1, insert --fuel-- before "cell" so it reads "a fuel cell"
In column 10, line 44 in Claim 3, delete "Oven" and replace with --given-- so it reads "at any given time"
In column 10, line 50 in Claim 6, delete "Mel" and replace with --fuel-- so it reads "The fuel supply of"

Signed and Sealed this
Fourth Day of June, 2013

Teresa Stanek Rea
*Acting Director of the United States Patent and Trademark Office*